United States Patent
Moshkovich et al.

(10) Patent No.: US 12,164,384 B2
(45) Date of Patent: Dec. 10, 2024

(54) MANAGING DATA ON SHUTDOWN OF STORAGE SYSTEM

(71) Applicant: Dell Products L.P., Round Rock, TX (US)

(72) Inventors: Igal Moshkovich, Even Yehuda (IL); Sudhir Srinivasan, Acton, MA (US); Doron Tal, Geva Carmel (IL); Yaron Dar, Sudbury, MA (US); Dan Aharoni, Brookline, MA (US)

(73) Assignee: Dell Products L.P., Round Rock, TX (US)

( * ) Notice: Subject to any disclaimer, the term of this patent is extended or adjusted under 35 U.S.C. 154(b) by 103 days.

(21) Appl. No.: 18/092,516

(22) Filed: Jan. 3, 2023

(65) Prior Publication Data

US 2024/0220369 A1    Jul. 4, 2024

(51) Int. Cl.
    *G06F 11/14* (2006.01)
(52) U.S. Cl.
    CPC ...... *G06F 11/1451* (2013.01); *G06F 11/1466* (2013.01); *G06F 11/1469* (2013.01)
(58) Field of Classification Search
    CPC ............. G06F 11/1451; G06F 11/1466; G06F 11/1469
    See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,058,123 B2 * | 6/2015 | Joshi | G06F 12/0877 |

(Continued)

FOREIGN PATENT DOCUMENTS

| | | |
|---|---|---|
| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Yair Leiboivch
(74) *Attorney, Agent, or Firm* — Ryan, Mason & Lewis, LLP

(57) ABSTRACT

Techniques are provided to manage data on shutdown of a data storage system. For example, a method comprises initiating a process to shut down a data storage system which comprises storage devices that store data associated with one or more non-persistent logical storage resources of a virtual storage layer which is configured by the data storage system. In response to initiating the process to shut down the data storage system, the method comprises: storing configuration data associated with the virtual storage layer, the configuration data comprising unique identifiers associated with the one or more non-persistent logical storage resources; and performing a data backup process to persistently store a copy of the data associated with the one or more non-persistent logical storage resources to a backup storage system.

20 Claims, 4 Drawing Sheets

(56) References Cited

U.S. PATENT DOCUMENTS

| | | | |
|---|---|---|---|
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,877,928 | B2* | 12/2020 | Nagrale .............. G06F 9/45558 |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,221,975 | B2 | 1/2022 | Puder et al. |
| 11,262,933 | B2 | 3/2022 | Matosevich et al. |
| 11,263,037 | B2* | 3/2022 | Kumble .............. G06F 9/45558 |
| 11,301,162 | B2 | 4/2022 | Matosevich et al. |
| 11,307,935 | B2 | 4/2022 | Keller et al. |
| 11,372,810 | B2 | 6/2022 | Keller et al. |
| 11,416,396 | B2 | 8/2022 | Shatsky et al. |
| 11,418,589 | B1 | 8/2022 | Spiegelman |
| 11,487,432 | B2 | 11/2022 | Aharoni et al. |
| 11,487,460 | B2 | 11/2022 | Keller et al. |
| 11,513,997 | B2 | 11/2022 | Keller et al. |
| 11,550,479 | B1 | 1/2023 | Shatsky et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2019/0243637 | A1* | 8/2019 | Nachimuthu .......... G06F 8/656 |
| 2020/0133503 | A1 | 4/2020 | Sun et al. |
| 2020/0404491 | A1* | 12/2020 | Sheng .................. H04W 12/33 |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0311759 | A1* | 10/2021 | Corrie ....................... G06F 8/63 |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |
| 2022/0113867 | A1 | 4/2022 | Aharoni et al. |
| 2022/0114184 | A1 | 4/2022 | Sharma et al. |
| 2022/0116454 | A1 | 4/2022 | Aharoni et al. |
| 2022/0121458 | A1 | 4/2022 | Moran et al. |
| 2022/0129292 | A1* | 4/2022 | Tsirkin ................ G06F 11/2017 |
| 2022/0129380 | A1 | 4/2022 | Shatsky et al. |
| 2022/0171567 | A1 | 6/2022 | Matosevich et al. |
| 2022/0187991 | A1 | 6/2022 | Keller et al. |
| 2022/0222113 | A1 | 7/2022 | Shatsky et al. |
| 2022/0342758 | A1 | 10/2022 | Tal et al. |
| 2022/0350497 | A1 | 11/2022 | Matosevich et al. |
| 2022/0358018 | A1 | 11/2022 | Bar Shalom et al. |
| 2022/0405254 | A1 | 12/2022 | Shatsky et al. |
| 2022/0414102 | A1 | 12/2022 | Shatsky et al. |

OTHER PUBLICATIONS

International Search Report and Written Opinion of PCT/US2019/024900 dated Jan. 7, 2020, 12 pages.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th Usenix Conference on File and Storage Technologies, Santa Clara, CA, Feb. 17-20, 2014, 17 pages.

Dell Emc, "Dell EMC VxFlex Family Overview," Technical White Paper, May 2019, 44 pages.

J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting to Know Dell EMC PowerFlex," Version 3.5.x, Rev. 02, Jan. 2021, 66 pages.

Dell EMC, "Dell EMC VxRack FLEX," Dell EMC Product Overview, Apr. 2018, 5 pages.

G. Soundararajan et al., "Dynamic Resource Allocation for Database Servers Running on Virtual Storage," Fast 2009: Proceedings of the 7th conference on File and storage technologies, Feb. 2009, pp. 71-84.

U.S. Appl. No. 17/511,695 filed in the name of Yosef Shatsky et al. on Oct. 27, 2021, and entitled "Write Cache Management.".

U.S. Appl. No. 17/512,890 filed in the name of Yosef Shatsky et al. on Oct. 28, 2021, and entitled "Utilizing Checkpoints for Resiliency of Metadata in Storage Systems.".

U.S. Appl. No. 17/569,198 filed in the name of Yosef Shatsky on Jan. 5, 2022, and entitled "Utilizing a Persistent Write Cache as a Redo Log.".

U.S. Appl. No. 17/583,365 filed in the name of Doron Tal et al. on Jan. 25, 2022, and entitled "Data Deduplication in a Storage System.".

U.S. Appl. No. 17/583,787 filed in the name of Michal Yarimi et al. on Jan. 25, 2022, and entitled "Intelligent Defragmentation in a Storage System.".

U.S. Appl. No. 17/681,449 filed in the name of Yosef Shatsky et al. on Feb. 25, 2022, and entitled "Optimization for Garbage Collection in a Storage System.".

U.S. Appl. No. 17/714,362 filed in the name of Doron Tal et al. on Apr. 6, 2022, and entitled "Optimization for Direct Write to Raid Stripes.".

U.S. Appl. No. 17/726,853 filed in the name of Irit Brener-Shalem et al. on Apr. 22, 2022, and entitled "Intelligent Load Scheduling in a Storage System.".

U.S. Appl. No. 17/729,219 filed in the name of Yosef Shatsky et al. on Apr. 26, 2022, and entitled "Load Distribution in a Data Storage System.".

U.S. Appl. No. 17/853,364 filed in the name of Yosef Shatsky et al. on Jun. 29, 2022, and entitled "Managing Lookup Operations of a Metadata Structure for a Storage System.".

U.S. Appl. No. 17/864,579 filed in the name of Yosef Shatsky et al. on Jul. 14, 2022, and entitled "Managing Granularity of a Metadata Structure for a Storage System.".

(56) References Cited

OTHER PUBLICATIONS

U.S. Appl. No. 17/868,045 filed in the name of Yosef Shatsky et al. on Jul. 19, 2022, and entitled "Managing Insert Operations of a Metadata Structure for a Storage System.".
U.S. Appl. No. 18/090,792 filed in the name of Christopher Trudel et al. on Dec. 29, 2022, and entitled "Cluster Management in Large-Scale Storage Systems.".

* cited by examiner

MANAGING DATA ON SHUTDOWN OF STORAGE SYSTEM

TECHNICAL FIELD

This disclosure relates generally to data storage systems and, more particularly, to techniques for managing data upon shutdown of a data storage system.

BACKGROUND

Information technology (IT) is widely used by all types of business enterprises for various purposes. Typically, business enterprises utilize compute, storage, and network resources, which are provided by third-party cloud service providers over the internet, to implement cloud-based datacenters for running their websites and applications and managing data on the cloud. For example, third-party public cloud service providers, such as Amazon Web Services (AWS), Microsoft Azure, etc., provide cloud services using or more of various cloud computing service models, such as Infrastructure-as-a-Service (IaaS), Platform-as-a-Service (PaaS), etc. Such cloud computing service models allow customers (e.g., business enterprises) to rent or lease compute, storage, and network resources to implement datacenters and host applications. Such cloud-based resources can be rented or leased based on different price models including, but not limited to, on-demand use (i.e., pay only for what is used), scheduled use for a defined time period (e.g. daily, weekly or monthly basis), etc.

Furthermore, the costs for cloud storage resources can vary depending on the type of storage and/or level of storage performance that is required or otherwise desired for a given application. For example, cloud-based storage providers typically offer different storage models, such as persistent storage and ephemeral storage, for managing logical storage resources (e.g., logical storage volumes, logical block devices, logical operating system disks, etc.) and associated data. More specifically, with persistent storage, the logical storage resources and associated data, which are associated with a given virtual machine instance or application instance, are saved (persisted) when the given virtual machine or application instance is deleted, stopped, terminated, etc., such that the storage resources are always available, regardless of the state of a running instance. On the other hand, with ephemeral storage, the logical storage resources and data, which are associated with a given virtual machine instance or application instance, are not saved when the given virtual machine or application instance is deleted, stopped, terminated, etc. In other words, ephemeral storage resources are non-persistent storage resources that are attached to active instances and exist only during the running lifetime of the instances. If a given instance is stopped, terminated, etc., the ephemeral storage resource, which is attached to the given instance, is lost.

SUMMARY

Exemplary embodiments of the disclosure include techniques for managing data on shutdown of a data storage system. For example, a method comprises initiating a process to shut down a data storage system which comprises storage devices that store data associated with one or more non-persistent logical storage resources of a virtual storage layer which is configured by the data storage system. In response to initiating the process to shut down the data storage system, the method comprises: storing configuration data associated with the virtual storage layer, the configuration data comprising unique identifiers associated with the one or more non-persistent logical storage resources; and performing a data backup process to persistently store a copy of the data associated with the one or more non-persistent logical storage resources to a backup storage system.

Another exemplary embodiment includes a cloud system which comprises a data storage system and a control system. The data storage system comprises storage devices that store data associated with one or more non-persistent logical storage resources of a virtual storage layer that is configured by the data storage system. The control system is configured to shut down the data storage system by executing a process which comprises: storing configuration data associated with the virtual storage layer, the configuration data comprising unique identifiers associated with the one or more non-persistent logical storage resources; and performing a data backup process to persistently store a copy of the data associated with the one or more non-persistent logical storage resources to a backup storage system.

Other embodiments will be described in the following detailed description of exemplary embodiments, which is to be read in conjunction with the accompanying figures.

DETAILED DESCRIPTION

Exemplary embodiments of the disclosure will now be described in further detail with regard to techniques for managing data on shutdown of a data storage system. More specifically, exemplary embodiments of the disclosure include systems and methods for managing and persisting data on shutdown of a scale-out software-defined storage system which utilizes ephemeral storage resources (e.g., ephemeral storage volumes, ephemeral block devices, etc.) to store data. As explained in further detail below, techniques are provided to allow a user (e.g., IT administrator) to temporarily shut down a storage system (e.g., cloud-based storage system) without losing non-persistent data stored on ephemeral storage resources of the data storage system. For example, a process for shutting down a data storage system with ephemeral storage resources incorporates a data backup process to copy the non-persistent data of the ephemeral storage resources to a backup data store so that the data can be restored upon restart of the data storage system. The exemplary techniques as described herein as particularly advantageous for use with cloud-based storage systems which utilize high-cost, high-performance storage devices to provide ephemeral storage, while being able to save on such cloud-based storage costs by temporarily shutting down the cloud-based storage system during certain periods (e.g., weekends, holidays, etc.) when the storage system will not be actively utilized, and backing up the data of the ephemeral storage to a backup storage system which utilizes cheaper cloud storage resources from which the data can be restored upon powerup of the cloud-based data storage system.

For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
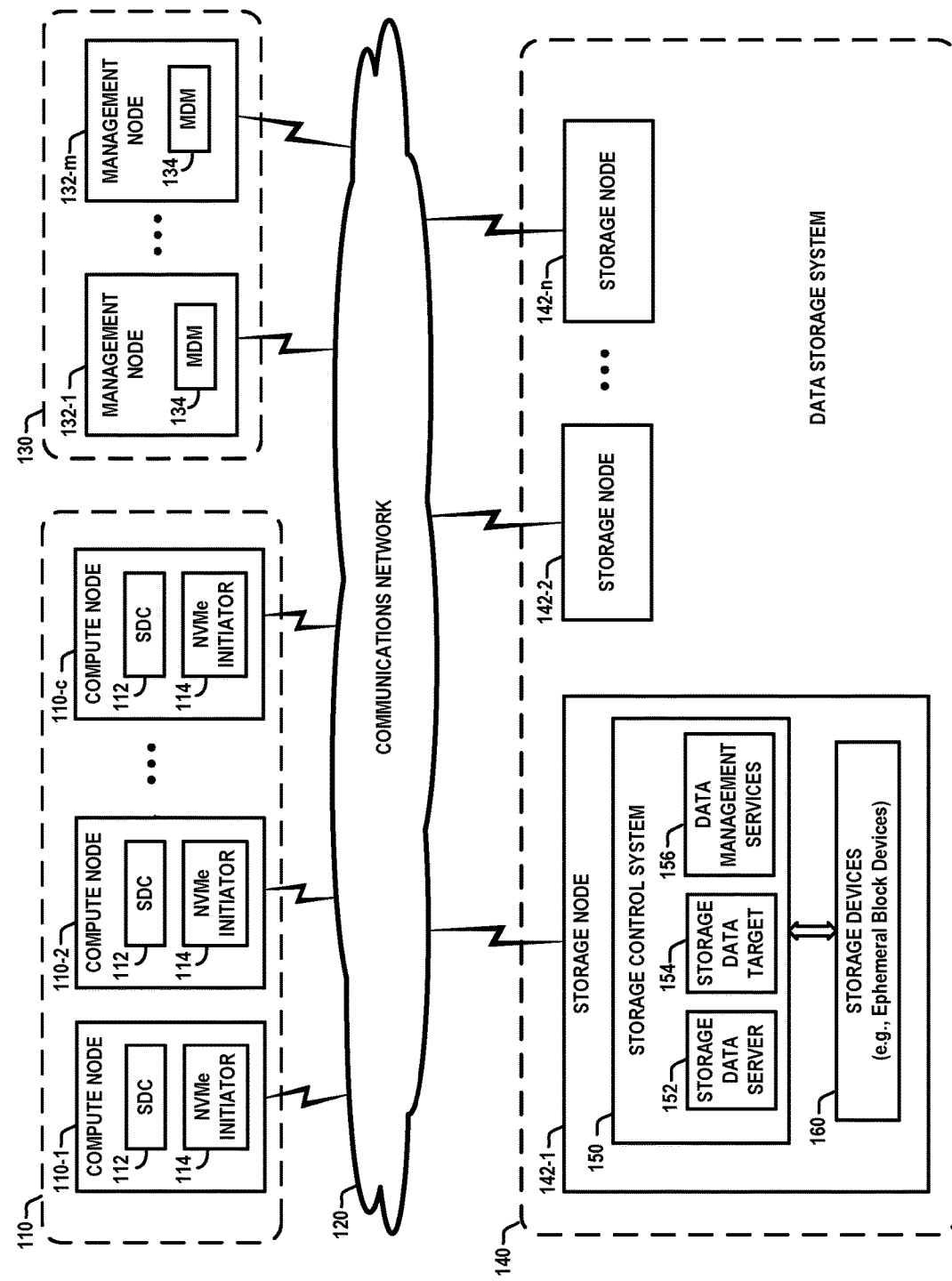
FIG. 1 schematically illustrates a network computing environment comprising a scale-out software-defined storage system which utilizes ephemeral storage to store user data, according to an exemplary embodiment of the disclosure.

FIG. 1 schematically illustrates a network computing environment comprising a scale-out software-defined storage system which utilizes ephemeral storage to store user data, according to an exemplary embodiment of the disclosure. In particular, FIG. 1 schematically illustrates a network computing environment 100 which comprises one or more compute nodes 110-1, 110-2, ... 110-c (collectively, compute nodes 110), a communications network 120, a management cluster 130 having a plurality of management nodes 132-1, ..., 132-m (alternatively, management nodes 132), and a data storage system 140 comprising a cluster of storage nodes 142-1, 142-2, ..., 142-n (collectively, storage nodes 142). In some embodiments, each compute node 110-1, 110-2, ... 110-c comprises client a storage data client (SDC) 112 and a non-volatile memory express (NVMe) initiator 114 (or NVMe driver), the functions of which will be explained below. In addition, each management node 132-1, ..., 132-m comprises a respective metadata manager (MDM) 134, the functions of which will be explained below.

As further shown in FIG. 1, the storage node 142-1 comprises a storage control system 150, and storage devices 160. In some embodiments, the storage control system 150 is a software component of the software-defined storage system, wherein the storage control system comprises various software components including, but not limited to, a storage data server (SDS) 152, a storage data target (SDT) 154, and other software-based data management services 156, the functions of which will be explained below. In some embodiments, the other storage nodes 142-2 ... 142-n have the same or similar configuration as the storage node 142-1 shown in FIG. 1.

The compute nodes 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities), and utilize the data storage system 140 to store user/application data. In some embodiments, the compute nodes 110 comprise application servers, database servers, etc. The compute nodes 110 can host virtual nodes such as virtual machines and hypervisors, and container systems. In some embodiments, the compute nodes 110 comprise a cluster of compute nodes of, e.g., an enterprise computing system, a cloud-based computing system, or other types of computing systems or information processing systems comprising multiple computing nodes associated with respective users.

The communications network 120 comprises one or more types of communications networks to enable communication between (i) the compute nodes 110 and the storage nodes 142, (ii) the compute nodes 110 and the management nodes 132, and (iii) the management nodes 132 and the storage nodes 142, as well as peer-to-peer communication between the storage nodes 142. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCOE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 142 comprises a server node (e.g., storage-only node) that is implemented on, e.g., a physical server machine or storage appliance comprising hardware processors, system memory, and other hardware resources that execute software and firmware to implement the functionality of the storage node 142 and the associated storage control system 150. In some embodiments, each storage node 142 comprises a plurality of control processors which execute a lightweight operating system (e.g., a customized lightweight Linux kernel) and functional software (e.g., software-defined storage software) to implement functions of the storage control system 150, as discussed in further detail below.

The storage devices 160 of a given storage node 142 can be, e.g., internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 160 may be implemented on each storage node 142. In this regard, the term "storage device" as used herein should be broadly construed to encompass all types of storage media including hybrid drives. On a given storage node 142, the storage control system 150 is configured to communicate with the storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc. In the case of NVMe-based devices, such devices can be configured to comprise ephemeral storage resources (e.g., ephemeral storage volumes, ephemeral block devices, etc.), as explained in further detail below.

The data storage system 140 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 140 comprises a dynamic scale-out storage system which allows additional storage nodes to be added (or removed) to the cluster to scale the performance and storage capacity of the data storage system 140. It is to be noted that each storage node 142 (with its associated storage devices 160) is an example of what is more generally referred to herein as a "storage system" or a "storage array."

In some embodiments, the data storage system 140 comprises a dynamic scale-out software-defined storage system which is configured to implement a high-capacity block-level SAN storage system (e.g., virtual SAN system) that consolidates the capacity of the local storage devices 160 (e.g., HDDs, SSDs, NVMe flash storage, flash PCIe cards etc.) of the storage nodes 142 into shared block storage which is logically partitioned into logical storage volumes identified by, e.g., logical unit numbers (LUNs). In an exemplary embodiment of a scale-out software-defined SAN storage system, as noted above, the storage control systems 150 comprise software components of a software-defined storage system, which are executed on the storage nodes 142 to implement a software-defined storage environment in which the storage nodes 142 form a loosely coupled storage server cluster and collectively communicate and operate to create a server-based SAN system (e.g., virtual SAN) to provide host access to a virtual pool of block storage using the combined storage capacity (e.g., local storage devices 160) of the storage nodes 142.

More specifically, in some embodiments, the SDC 112 components, the MDM 134 components, the SDS 152 components, the SDT 154 components, and the data management services 156 of the storage control systems 150 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture that can grow from a few servers to thousands of severs.

For example, the SDS 152 component comprises a service that is configured to manage the storage devices 160 of the corresponding storage node 142 and provide back-end access to the storage devices 160. Each server (e.g., storage node 142) that contributes some or all of its storage media (e.g., storage devices 160) to the storage cluster will run an instance of the SDS 152 component which allows the scale-out software defined data storage system 140 to aggregate the storage media while sharing such storage resources as one or more unified pools on which logical volumes are created.

More specifically, in the scale-out software-define storage environment, the SDS 152 components of the storage control systems 150 are configured to create and manage storage pools (e.g., virtual pools of block storage) by aggregating storage capacity of the respective storage devices 160 and dividing each storage pool into one or more volumes, wherein the volumes are exposed to the SDC 112 components as block devices, wherein the block devices (e.g., virtual disks) are assigned unique identifiers (e.g., SCSI IDs). For example, a block device may comprise one or more volumes of a storage pool. Each block device comprises any number of actual physical storage devices, wherein each block device is preferably homogenous in terms of the type of storage devices that make up the block device (e.g., a block device can include only HDD devices or SSD devices, etc.). In this regard, each instance of the SDS 152 that runs on a respective one of the storage nodes 142 contributes some or all of its local storage space to an aggregated virtual pool of block storage with varying performance tiers (e.g., HDD, SSD, etc.) within a virtual SAN.

In some embodiments, each server node (e.g., compute node 110) which runs a client application that consumes storage of the data storage system 140 runs an instance of the SDC 112 component. The SDC 112 component, which runs on a given compute node, comprises a lightweight block device driver that is deployed to expose the storage volumes as block devices to the client application that executes on the given compute node 110. For example, in some embodiments, the SDC 112 component provides access to the logical volumes via a host SCSI layer. To enable client access to the data storage system 140, storage volumes are provisioned, and one or more storage volumes are mapped to each SDC 112, wherein the mapping of a given volume to a given SDC 112 exposes the given volume to the given SDC 112, effectively creating a block device on the SDC 112. In this regard, the SDC 112 of a given compute node 110 exposes block devices representing the virtual storage volumes that are currently mapped to the SDC 112.

During operation, the SDC 112 essentially operates as a block driver for applications executing on a given compute node 110, wherein the SDC 112 intercepts I/O requests, and utilizes the intercepted I/O request to access the block storage managed by the SDS 152 components. In particular, the SDC 112 component is installed in the operating system or hypervisor hosting the application layer, and provides the operating system or hypervisor (which runs the SDC 112) access to the logical block devices (e.g., volumes). The SDC 112 components have knowledge of which SDS 152 components hold their respective block data, so multipathing can be accomplished natively through the SDC 112 components. In other words, the communications network 120 is configured such that each SDC 112 connects to every SDS 152, which eliminates the need for multipath software.

The SDT 154 is a software component that is configured to provide support for NVMe-oF, in particular, NVMe over TCP (NVMe/TCP) which enables NVMe-oF across a standard Ethernet network. In some embodiments, the SDT 154 component is configured in the storage layer to handle the I/O requests from the NVMe initiators 114 that run on the compute nodes 110 to provide support for an NVMe/TCP storage protocol for front end connectivity, and thus, allow the use of NVMe/TCP hosts in addition to the SDC 112 components. In some embodiments, each SDT 154 comprises an NVMe target that is configured to translate control and I/O data path packets to the NVMe standard protocol, wherein each NVMe initiator 114 is serviced by a plurality of SDT 154 components (e.g., 4, 8, etc.), depending on the supported number of paths in an NVMe multipathing driver. In essence, a I/O request is sent from an NVMe initiator 114 (which is installed in the host operating system or hypervisor) to a target SDT 154 via an NVMe/TCP protocol, and the target SDT 154 communicates with a target SDS 152 to direct the I/O request to the target SDS 152. In some embodiments, while both connection methods (SDC 112 and NVMe/TCP) are supported at the same time, a given volume can only be presented using one protocol or the other.

The data management services 156 include various software components to implement various operations including, but not limited to, inline data compression/decompression, deduplication, thin provisioning, and data protection operations such as data replication (e.g., journal-based asynchronous replication), backup, snapshots, and data protection and resiliency schemes based on data striping and/or parity (e.g., erasure coding, RAID, etc.), and other types of data management operations, depending on the system configuration.

In some embodiments, the management nodes 132-1, . . . , 132-*m* comprise servers (e.g., control servers) that host and run respective instances of the MDM 134 component to implement a management layer which operates to configure and manage the software-defined storage system in the network computing environment 100. In general, the MDM 134 component is a service that functions as a monitoring and configuration agent of the storage environment. In a multi-MDM environment such as shown in FIG. 1, the management nodes 132 collectively host a tightly-coupled cluster of MDM 134 components (referred to herein as MDM cluster), which is configured to manage storage system configuration and supervise the operations of the storage system.

For example, the MDM cluster manages the storage system by aggregating the storage exposed by the SDS 152 components to create a virtual storage layer (e.g., virtual SAN storage layer), wherein logical volumes are defined over storage pools and exposed to host applications as local block devices using the SDC 112 components, as discussed above. The MDM cluster controls the flow of data in the software-defined storage environment, but does not operate in the I/O data path. The MDM cluster is configured to manage various types of metadata associated with the software-defined storage system.

For example, the MDM cluster generates and maintains metadata which comprises information about volume distribution across the cluster of storage nodes 142 which execute the SDS 152 components, and distributes the mapping information to the SDC 112 components to inform the SDC 112 components where to store and retrieve data for each portion of the address space. In particular, such metadata includes connectivity data that maps the SDC 112 components to the SDS 152 components of the storage nodes 142, wherein such mapping information is provided to the SDC 112 and SDS 152 components to allow such components to control input/output (I/O) data path operations (e.g., allow each SDC 112 component to communicate with each SDS 152 component to access data in logical volumes that are mapped to the SDC 112 components). As noted above, the MDM 134 components operate outside of the data path such that no I/O operations run through the MDM 134 components. In addition, the MDM cluster obtains and maintains connectivity status updates from the SDC 112 components to monitor all connections between SDC 112 and the SDS 152 components to determine the current system state, and posts events whenever a given SDC 112 component connects to or disconnects from a specific IP address of a given SDS 152 component.

In addition, the MDM cluster is configured to manage various management operations such as data migration, rebuilds, and other system-related functions. In this regard, the MDM cluster generates and manages various types of metadata that are required to perform various management operations in the storage environment such as, e.g., performing data and volume migration operations, performing rebalancing operations, managing configuration changes, managing the software-defined storage system components (e.g., SDC 112, SDS 152, SDT 154, etc.), maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. For example, the MDM cluster communicates with the SDC 112 components to provide notifications of changes in data layout, and communicate with the SDS 152 components to coordinate rebalancing operations.

In some embodiments of the exemplary multi-MDM environment as shown in FIG. 1, the plurality of MDM 134 components are separately deployed on respective server nodes and are configured to implement a redundant MDM cluster (e.g., 3-node or 5-node MDM cluster) to provide a high-availability solution for the management layer. Each MDM 134 component in the MDM cluster is assigned a specific role. For example, in an exemplary embodiment, an MDM cluster comprises a primary MDM (or master MDM), at least one secondary MDM (or slave MDM), and at least one tiebreaker MDM. The primary MDM is configured to control and communicate with all software-defined storage system components (e.g., SDC 112, SDS 152, SDT 154, etc.) that reside on server nodes (e.g., compute-only server nodes, storage-only server nodes, hyperconverged server nodes) in the given software-defined storage environment, and to communicate with a management MDM node of a remote replication-enabled storage system, etc.

The secondary MDM is configured to assume the role as a primary MDM, if needed in the event of a failure of the primary MDM. In some embodiments, the primary MDM manages and updates an MDM repository (e.g., database which stores the system metadata (e.g., SDS configuration data, etc.), where the MDM repository is continuously replicated to the secondary MDM, so that the secondary MDM can take over the role as a primary MDM without delay. In this regard, the primary and secondary MDM components are management nodes which are MDM replicas. On the other hand, the tiebreaker MDM is assigned a sole role to help determine which MDM node in the MDM cluster is the primary MDM. The tiebreaker MDM does not assume any management functions.

In some embodiments, a 3-node MDM cluster is utilized to provide a high-availability solution for the management layer, which includes one primary MDM component, one secondary MDM component, and one tiebreaker MDM component, all of which are separately deployed on different server nodes. In other embodiments, a 5-node MDM cluster is utilized to provide a high-availability solution for the management layer, which includes one primary MDM component, two secondary MDM components, and two tiebreaker MDM components, all of which are separately deployed on different server nodes. The 3-node and 5-node MDM clusters ensure that there is always an odd number of MDM components in the MDM cluster which, in turn, guarantees that there is always a majority of MDM components electing the primary MDM. Further, with regard to the MDM manager, the 3-node cluster (with only one secondary MDM component) allows for a single point of failure, while the 5-node cluster (with two secondary MDM components) allows for two points of failure and, thus, increased resiliency.

The MDM cluster, in particular, the primary MDM component, is responsible for generating and managing a large amount of metadata associated with all logical entities of the virtual storage system, such as protection domains, replication groups, fault sets, storage volumes, etc. In some embodiments, the software-defined storage system utilizes various logical entities which link the physical layer to the virtual storage layer, wherein such logical entities include protection domains, fault sets, and storage pools. In some embodiments, a protection domain is a logical entity which comprises a group of SDS 152 components that provide backup for each other. Each SDS 152 component belongs to only one protection domain such that each protection domain comprises a unique set of SDS 152 components. In some embodiments, each protection domain can have up to a maximum number of SDS components (e.g., 128 SDS component). The use of protection domains enables optimal performance, reduction of mean time between failure (MTF) issues, and the ability to sustain multiple failures in different protection domains.

Further, in some embodiments, a fault set is a logical entity which defines a logical group of SDS 152 components (within a protection domain) that are more inclined to fail together, e.g., a group of SDS 152 components within a given protection domain that are all powered in a same rack. By grouping SDS 152 components into a given fault set, the system is configured to mirror the data for all storage devices in the given fault set, wherein mirroring is performed on SDS 152 components that are outside the given fault set. A fault unit can be either a fault set or an SDS 152 component that is not associated with a fault set. In some embodiments, user data is maintained in a RAID-1 mesh mirrored layout, where each piece of data is stored on two different fault units. The copies are distributed over the storage devices according to an algorithm that ensures uniform load of each fault unit in terms of capacity and expected network load.

Moreover, in some embodiments, a storage pool is logical entity which defines a set of physical storage devices in a protection domain, wherein each storage device belongs to only one storage pool. When a volume is configured over the virtualization storage layer, the volume is distributed over all devices residing in the same storage pool. Each storage pool comprises a homogeneous set of storage devices (e.g., HDD storage pool, or SSD storage pool) to enable storage tiering. In some embodiments, each volume block has two copies located on two different fault units (e.g., two different SDS components), which allows the system to maintain data availability following a single-point failure.

FIG. 1 shows an exemplary embodiment of a two-layer deployment in which the SDC 112 components (which consume storage) are deployed separately from the SDS 152 components (which contribute storage), e.g., the SDC 112 components are deployed on compute-only server nodes which host end-user applications, while the SDS 152 components are deployed on storage-only server nodes which contribute storage to the virtual SAN storage system. Moreover, while FIG. 1 shows an exemplary embodiment in which the MDM 134 components (which manage storage blocks and track data locations across the storage system) are separately deployed on management nodes 132, in some embodiments, the MDM 134 components can be deployed along with the SDS 152 components on the storage nodes 142 (e.g., each MDM 134 can be deployed on a different storage-only server node).

In other embodiments, a converged infrastructure (e.g., hyperconverged infrastructure) can be implemented to provide a single-layer deployment in which, e.g., the SDC 112 components and the SDS 152 components are deployed on the same servers (each server node deploys an SDC 112 component and an SDS 152 component) such that each server node is a data storage consumer (compute node) and a data storage supplier (storage provider node). In addition, for a single-layer deployment, the MDM 134 components can be deployed on different server nodes which also host the SDC 112 and SDS 152 components. In other embodiments, the system of FIG. 1 can be a hybrid system that is implemented with a combination of a single-layer and two-layer deployment It is to be understood that FIG. 1 schematically illustrates an exemplary embodiment of a software-defined storage system which implements various components (e.g., SDC 112, MDM 134, SDS 152, SDT 154, etc.,) which collectively provide the functionality that allows the storage system to dynamically scale linearly to hundreds and thousands of nodes. In some embodiments, the exemplary software-defined storage system and associated components as described herein correspond to a family of commercially available PowerFlex IM software-defined storage products from Dell Technologies, which can be utilized to create a server-based SAN from local server storage using, e.g., x86 servers, wherein the PowerFlex storage system converts direct-attached storage into shared block storage that runs over an IP-based network.

Moreover, in some embodiments, FIG. 1 the network computing environment 100 illustrates an exemplary architecture of a cloud-based datacenter that can implement a scale-out software-defined storage system (e.g., PowerFlex storage system) to handle the storage configuration and management functionalities of the cloud-based datacenter. In the context of a cloud-based storage services, the local storage devices 160 of the storage nodes 142 can include storage devices that are configured to provide persistent storage (e.g., persistent storage volumes, persistent block devices, etc.), and/or storage devices that are configured to provide ephemeral (non-persistent) storage (e.g., ephemeral storage volumes, ephemeral block devices, etc.). As noted above, ephemeral storage comprises non-persistent storage resources which are attached to active instances and which are lost when the active instances are stopped or terminated.

For example, in the context of the software-defined storage environment, as noted above, the storage control systems 150, in particular, the SDS 152 components, are configured to create and manage storage pools (e.g., virtual pools of block storage) by aggregating storage capacity of the respective storage devices 160 and dividing each storage pool into one or more storage volumes, wherein the storage volumes are exposed to the SDC 112 components as block devices that are assigned unique identifiers (e.g., SCSI IDs). In embodiments where the storage volumes (and associated block devices) generated and managed by the SDS 152 components comprise ephemeral storage volumes that are stored in the local storage devices 160 of the storage nodes 142, such ephemeral storage volumes and associated data would be lost if the SDS 152 components were temporarily inactivated due to a temporary shutdown of the software-defined storage system.

To preserve information regarding the ephemeral storage volumes and the associated data upon shutdown of the software-defined storage system, a data backup process is implemented as part of a storage system shutdown process to preserve storage system configuration information (e.g., information regarding the virtual storage layer) and backup the data of the ephemeral storage volumes to a backup data store so that the data can be restored upon restart of the data storage system. In this regard, exemplary storage system shutdown and restore processes will be discussed in conjunction with the exemplary flow diagrams of FIGS. 2 and 3. Moreover, for illustrative purposes, exemplary techniques for preserving non-persistent data of ephemeral storage resources upon a temporary shutdown of a data storage system and restoring such data upon subsequent startup of the data storage system will be discussed in the context of a software-defined storage system, such as the PowerFlex storage system, which is offered to customers as part of the storage service offerings of a public cloud platform, such as AWS. It is to be understood however, that the exemplary techniques discussed herein can be implemented by other public cloud platforms which offer data storage systems that utilize ephemeral storage (e.g., as part of a high-performance storage solution) to store customer data.

Currently, AWS offers an Elastic Compute Cloud (EC2) service (under an IaaS), which provides EC2 services related to computing, storage, and network, for rent. For example, the EC2 service provides virtual machines (EC2 instances), an Elastic Block Store (EBS) service to store and manage data on virtual drives, etc. More specifically, the EC2 service provides features such as (i) virtual computing environments such as virtual machines (referred to as instances), (ii) various configurations of CPU, memory, storage, and networking capacity for such instances (referred to as instance types), (iii) ephemeral storage volumes that are utilized by instances to store data on a temporary basis such that when the instance is deleted, temporarily stopped, etc., the data in the ephemeral storage volumes is deleted (iv) persistent storage volumes to store data using different types storage volumes, e.g. EBS volumes, (v) multiple physical locations for resources, such as instances and EBS volumes, referred to as Regions or Availability Zones (AZ), etc. In addition, AWS offers a storage service referred to as Simple Storage Service (S3). S3 provides an object storage services that allows user to store and retrieve data in files that are addressed as objects. The S3 object storage service offers a low-cost storage solution (e.g., cost-effective storage classes), which provides scalability, data availability, security, and performance.

Currently, AWS offers the PowerFlex storage solution as a service to customers, which allows customers to configure and utilize a PowerFlex software-defined storage platform to manage the storage needs of their cloud-based datacenters. A customer selects from one of several disk types, e.g., persistent storage volumes or ephemeral storage volumes, for storing data. In particular, the SDS 152 components (FIG. 1) can utilize persistent storage volumes (e.g., EBS volumes) to store data, wherein the data storage system can be powered down, and the data will persist. The EBS volumes include SSD-based volumes or HDD-based values. The SSD-based volumes include general purpose SSD (gp2) volumes, and next generation general purpose SSD (gp3) volumes. The next-generation general purpose SSD (gp3) volumes for EBS enable customers to provision performance independent of storage capacity, i.e., with gp3 volumes, customers can scale IOPS (input/output operations per second) and throughput (providing reserved throughput I/O) without having to provision additional block storage capacity, and pay only for the resources they need. On the other hand, with the general purpose SSD (gp2) volumes, performance is tied to storage capacity, where the customer can obtain higher IOPS and throughput for their applications by provisioning a larger storage volume size.

On the other hand, the SDS 152 components (FIG. 1) can utilize ephemeral storage volumes that are stored on NVMe SSD drives, which are locally attached at the instance level. With this storage service, throughput is not shared with other instances, so I/O reservation is not necessary and I/O is not throttled. The use of ephemeral storage volumes stored on local NVMe SSD devices provide a higher performance storage solution for storing and accessing data, as compared to utilizing persistent EBS storage volumes. However, the ephemeral storage volumes on the local NVMe SSD drives are not persistent such that when the SDS 152 components are inactivated in response to a shutdown of the data storage system, the data stored on the NVMe SSD devices is lost. There can be circumstances, however, in which a customer (e.g., IT administrator) would like to temporarily shut down the cloud-based data storage system to save on the costs of the storage services, e.g., during weekends or holidays, etc., when it is expected that the storage system will not be utilized. Accordingly, exemplary embodiments of the disclosure provide cost-optimized solutions (e.g., minimal IT overheard) to enable a customer to temporarily shut down and subsequently startup a cloud-based data storage system in way that retains the ephemeral data and storage system configuration, without data loss and without having to reinstall and reconfigure the storage system.

Figure 2:
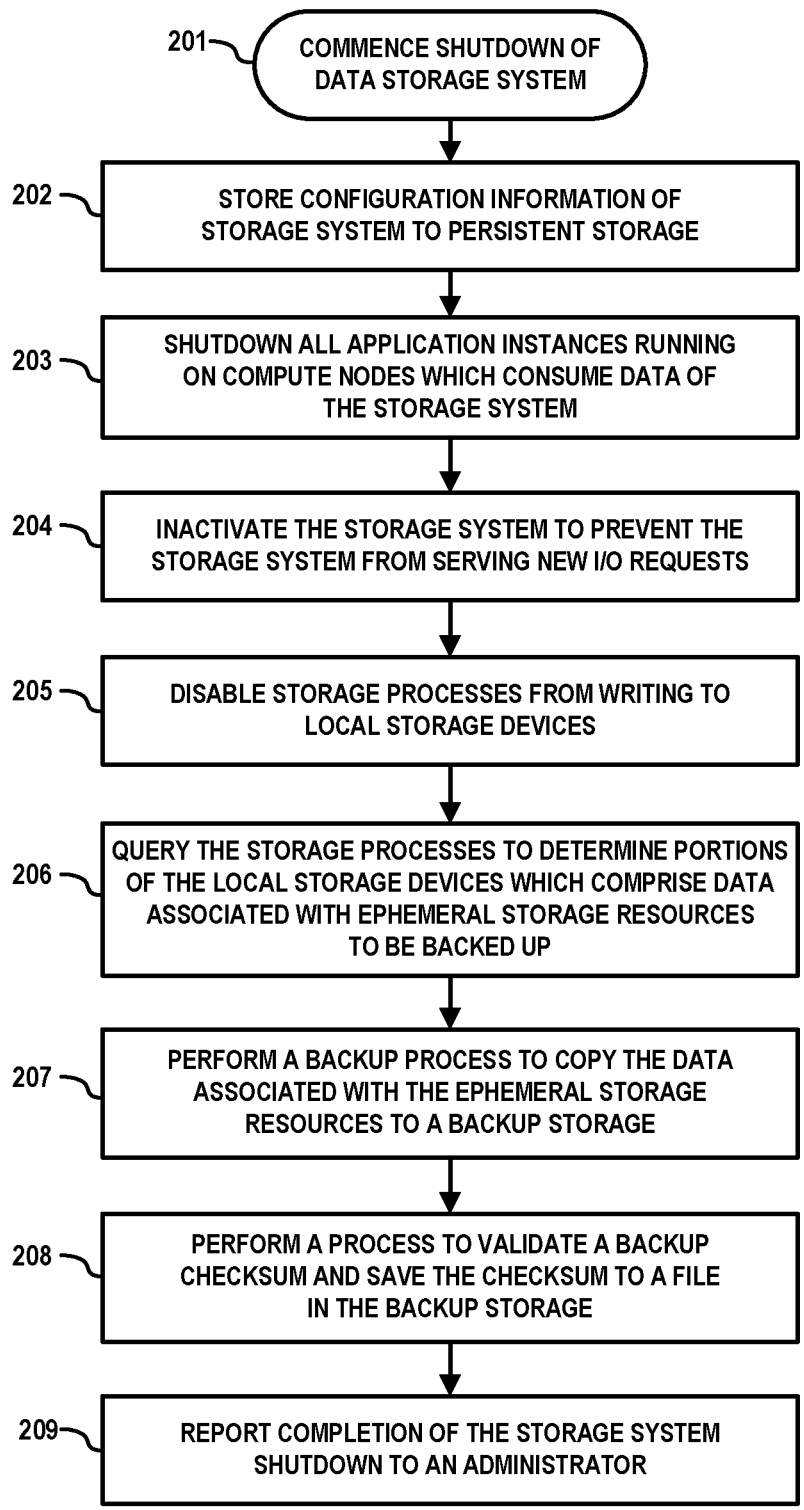
FIG. 2 illustrates a flow diagram of a method for managing data in ephemeral storage upon shutdown of a data storage system, according to an exemplary embodiment of the disclosure.

For example, FIG. 2 illustrates a flow diagram of a method 200 for managing data in ephemeral storage upon shutdown of a data storage system, according to an exemplary embodiment of the disclosure. For illustrative purposes, an exemplary embodiment of the process flow of FIG. 2 will be discussed in the context of the software-defined storage system of FIG. 1 which is implemented in a cloud-based system such as AWS. An initial step is to commence/initiate shutdown of the data storage system (block 201). For example, a control system, which is provided by a cloud platform, or which is part of the data storage system, can be configured to shut down the data storage system through execution of an automated or semi-automated process. For example, in some embodiments, the shutdown process is initiated by an IT administrator executing a software script, wherein various operations of the software script are performed by components of the software-defined storage system. In other embodiments, the shutdown process may be a native function that is provided by the software-defined storage system, where the shutdown process can be invoked using a software management client or tool including, but not limited to, a command line interface (CLI), a storage system graphical user interface (GUI), a plug-in module, etc.

In response to commencement of the shutdown process, a current system configuration of the storage system is stored to persistent storage (block 202). For example, in some embodiments, the storage system configuration maintained by the MDM in the MDM repository is stored to persistent storage of a given storage service of the cloud service provider (e.g., EBS volume or S3 storage on AWS). The system configuration comprises information regarding the virtual storage layer configuration including, e.g., logical volume identifiers (e.g., LUNs), logical block device IDs (e.g., ISCI IDs), mapping of logical storage volumes to client drivers (e.g., SDC components) and other information regarding the virtual storage layer which is utilized to subsequently restore the virtual storage layer of the storage system with the same configuration, etc.

Next, all application instances (e.g., applications, virtual machines, EC2 instances, etc.) running on the compute nodes, which consume data of the storage system or otherwise access the storage system, are shutdown (block 203). This process is performed to ensure that the client applications will not issue new I/O requests to the storage system and, thus, prevent the client applications from crashing as a result of issuing I/O requests to the storage system subsequent to the shutdown of the storage system. The storage system is then inactivated to prevent the storage system from serving new I/O requests (block 204). The inactivation of the storage system ensures that no applications will have access to the storage system. For example, in some embodiments, inactivation of the storage system of FIG. 1 prevents the SDC 112 components and NVMe initiators 114 from obtaining I/O access to storage volumes of the virtual storage layer.

In addition, the shutdown process comprises disabling the storage processes from writing data to the local storage device which stores the data associated with ephemeral storage resources (e.g., ephemeral storage volumes) (block 205). For example, in some embodiments, the shutdown process instructs the SDS 152 components on the storage nodes 142 to not perform any new I/O operations, although the SDS 152 components can continue to complete pending I/O requests which, for example, (i) were received from client applications prior to commencement of the shutdown process, (ii) are needed to complete pending data management operations such as rebalancing and rebuild operations, that were commenced prior to the shutdown process, etc.

A data backup process is then performed. For example, in some embodiments, an exemplary data backup process begins by querying the storage processes (e.g., SDS 152 components) that execute on the storage nodes, which have the local storage devices that store the data associated with the ephemeral storage resources, to determine those portions of the local storage devices which hold the data that is to be backed up (block 206). In some embodiments, the MDM system is initially queried to determine the SDS 152 components that manage the local storage devices which hold the data associated with the ephemeral storage resources to be backed up.

A backup command is issued to the storage processes to perform a backup process to copy the data associated with the ephemeral storage resources (e.g., ephemeral storage volumes) to a target backup storage system (block 207). More specifically, in some embodiments, an offline data backup process is performed to store an offline copy of the data associated with the ephemeral storage resources to the target backup storage system. An offline data backup process in some embodiments comprises, for example, a "cold backup" process, or a backup process performed with the data storage system inactivated and therefore not accessible to users. An offline copy of the data in some embodiments comprises, for example, data that is not accessible to users while, e.g., the data storage system is inactivated and shut down.

In some embodiments, the offline backup process is performed in parallel, wherein the SDS 152 components on the storage nodes 142 concurrently operate in parallel to store an offline copy of their respective local data (in ephemeral storage) to the backup storage system. In some embodiments, the backup operation is performed by each SDS 152 component copying a "chunk" of data (or block of data) at a time to the backup storage system (e.g., where the size of each data chunk is on the order of megabytes or gigabytes). By performing the data backup process based on data chunks, in the event of a given failure (e.g., network failure, backup operation failure, etc.), the backup process can be resumed from the point of failure. Moreover, in some embodiments, the backup process is configured to skip data "chunks" which are not in use, or which have invalid data that has been released for overwrite, etc. The use of data chunks to perform the backup operation results in improved performance and minimizes the amount of backup storage capacity needed to maintain the data.

In some embodiments, to maintain resiliency and protect against potential errors during a subsequent data restore process, etc., the backup process can be performed by storing a copy of the data in the backup storage system using a redundant array of independent drives (RAID) configuration. For example, in some embodiments, the data backup process can be configured to store the data in the backup storage system using a RAID 1 level of data storage which involves mirroring a copy of the backed-up data to a separate drive. In some embodiments where the backup storage system comprises object storage, the objects correspond to physical storage devices, so that the system may readily recover. In addition, in some embodiments, to minimize the amount of backup storage capacity needed to persist the data, an in-line data compression process can be implemented to compress the data chunks and store the compressed data in the backup storage system.

Moreover, in some embodiments, a checksum process is performed in conjunction with the data backup process to ensure the integrity of the data backup. In particular, in some embodiments, a checksum process involves generating a checksum for each block of data (e.g., data chunk, page, etc.) to be written to the backup storage system, validating the checksum, and then saving the checksum to a file in the backup storage system (block 208). The checksum value can be computed and validated using suitable techniques known to those of ordinary skill in the art. The checksum for a given data block (e.g., page) is written with the given data block during the backup process and it validates the integrity of the given data block prior to writing the given data block to the backup storage system. The checksums are subsequently used during a restore operation to validate the integrity of the backup data.

The backup process proceeds until a valid copy of all the data associated with the ephemeral storage resources is stored in the backup storage system at which time, the backup process is complete and reported to the IT administrator (block 209). Upon shutdown of the data storage system, the local storage devices providing the ephemeral storage are essentially deallocated and freed for use, potentially, by other storage systems of customers in a cloud platform. In this regard, the data associated with the ephemeral storage resources, which is stored on the local storage devices, is no longer accessible by the data storage system from the perspective of the client or user. Upon a subsequent startup of the data storage system, the data is restored from the backup storage system to local storage devices of a new cluster of storage nodes with local storage devices that are allocated to the data storage system. The new cluster of storage nodes can include the same set of storage nodes previously allocated to the data storage system before shutdown, at least some storage nodes previously allocated to the data storage system before shutdown, or an entire new set of storage nodes.

Figure 3:
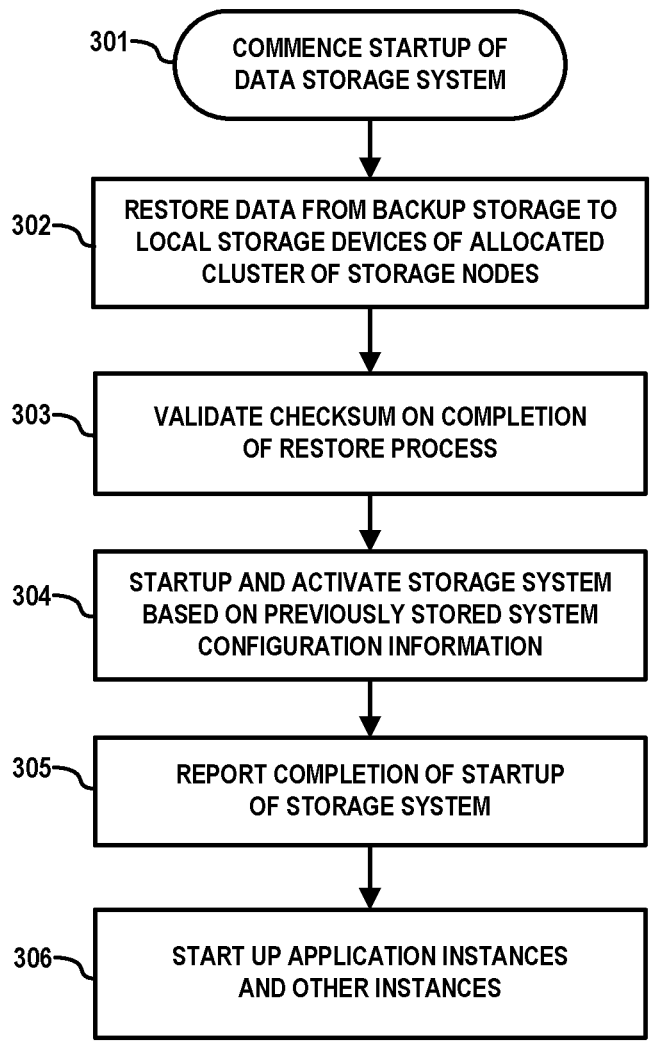
FIG. 3 illustrates a flow diagram of a method for restoring data on startup of a data storage system, according to an exemplary embodiment of the disclosure.

Next, FIG. 3 illustrates a flow diagram of a method 300 for restoring data on startup of a data storage system, according to an exemplary embodiment of the disclosure. An IT administrator commences/initiates startup of the data storage system (block 301). A control system, which is provided by a cloud platform, or which is part of the data storage system, can be configured to restart the data storage system through execution of an automated or semi-automated process. For example, in some embodiments, the startup process is initiated by an IT administrator executing a software script, wherein various operations of the software script are performed by components of the software-defined storage system. In other embodiments, the startup process may be a native function that is provided by the software-defined storage system, where the shutdown process can be invoked using a software management client or tool including, but not limited to, a CLI, a storage system GUI, a plug-in module, etc.

An initial step of the startup process comprises restoring data from the backup storage system to local storage devices (e.g., NVMe SSD drives) of a newly allocated cluster of storage nodes (block 302). As noted above, the newly allocated cluster of storage nodes may comprise all, some, or none of the storage nodes previously allocated to the data storage system prior to shut down. For example, in some embodiments, the data storage system can be restored to a different AZ or Region in the event of, e.g., a disaster at the previous AZ or region, a lower available cost, etc. In embodiments where the backup data was compressed during the shutdown process, an in-line data decompression process is implemented to decompress the data as it is restored to the local storage devices of the newly allocated cluster of storage nodes.

In some embodiments, a checksum process is performed in conjunction with the data restore process to ensure the integrity of the restored data. In particular, in some embodiments, a checksum validation process is performed (block 303) which involves generating a checksum for each restored block of data (e.g., data chunk, page, etc.) that is written to the local storage devices, and comparing the newly generated checksum against the corresponding saved checksum to ensure that the new and previous checksums match. The checksum validation process can be performed using suitable techniques known to those of ordinary skill in the art.

A next step comprises starting up and activating the data storage system based on the previously stored system configuration information (block 304). More specifically, in some embodiments, the storage processes (e.g., the SDS 152 components) on the new cluster of storage nodes are activated to claim the local storage devices having the restored data, and the data storage system is activated (e.g., protection domains are activated) to enable I/O access to client applications. Since the logical storage resources (e.g., logical storage volumes, logical block devices, logical disks, etc.) previously used by the storage system are persisted and restored to the previous state, the IT administrator does not need to perform actions such as recreating storage volumes, mapping the storage volumes to clients (e.g., SDC 112 components or NVMe initiators 114), reconfiguring block device identifiers (e.g., SCSI IDs), as the previously stored system configuration data of the virtual storage layer is utilized during the restore process to automatically return the virtual storage layer of the storage system to its previous state before shutdown. In other words, the restore process utilizes the stored system configuration data to instantiate the previous virtual storage layer configuration of the storage system on the newly allocated physical storage devices/nodes, while utilizing the same logical entities (e.g., storage pools, protection domains, etc.) which link the new physical layer (e.g., newly allocated SDS components, storage nodes, local storage devices) to the restored virtual storage layer.

When the startup process is complete and the data storage system is ready for use, the completion of the startup process is reported to the IT administrator (block 305), and the application instances and other instances, which utilize the storage system, are started up and activated (block 306). For example, in the exemplary embodiment of FIG. 1, the client drivers (e.g., SDC 112 components and NVMe initiators 114) are activated to enable I/O access to the restored data storage system, and application instances (e.g., virtual machines, EC2 instance, etc.) on the compute nodes, which consume data of the restored storage system, are activated.

Figure 4:
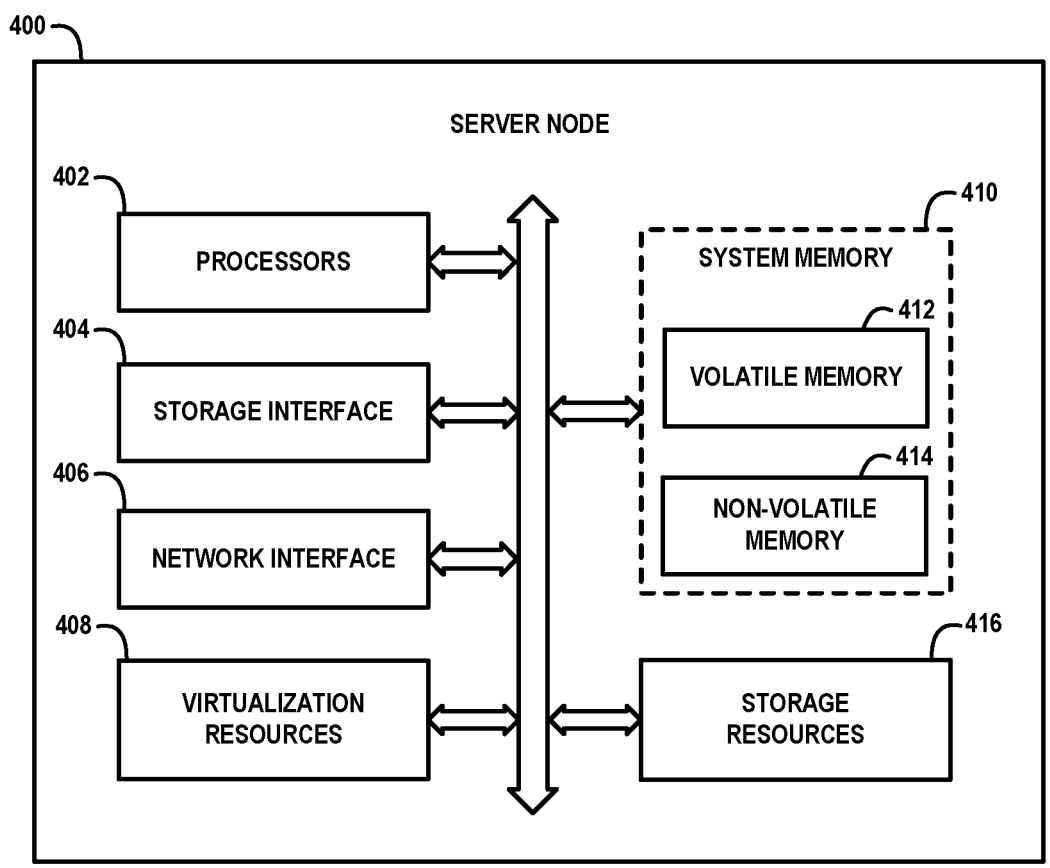
FIG. 4 schematically illustrates a framework of server node for hosting software components of scale out software-defined storage system, according to an exemplary embodiment of the disclosure.

FIG. 4 schematically illustrates a framework of server node for hosting software components of scale out software-defined storage system and distributed hierarchical cluster management system, according to an exemplary embodiment of the disclosure. For example, FIG. 4 schematically illustrates an exemplary hardware/software configuration of, e.g., the storage nodes shown in the drawings. The server node 400 comprises processors 402, storage interface circuitry 404, network interface circuitry 406, virtualization resources 408, system memory 410, and storage resources 416. The system memory 410 comprises volatile memory 412 and non-volatile memory 414. The processors 402 comprise one or more types of hardware processors that are configured to process program instructions and data to execute a native operating system (OS) and applications that run on the server node 400.

For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities as discussed herein. In some embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well execute one or more of the various modules and functionalities of a storage system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components of a software-defined storage system as described, as well as the exemplary storage system shutdown and startup processes as described herein, are implemented using program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of NAND Flash storage devices, SSD devices, or other types of next generation non-volatile memory (NGNVM) devices. The system memory 410 can be implemented using a hierarchical memory tier structure wherein the volatile memory 412 is configured as the highest-level memory tier, and the non-volatile memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   initiating a process to shut down a data storage system which comprises storage devices that store data associated with an application instance in one or more non-persistent logical storage resources of a virtual storage layer which is configured by the data storage system to store the data associated with the application instance;
   in response to initiating the process to shut down the data storage system:
   storing configuration data associated with the virtual storage layer, the configuration data comprising information regarding a logical configuration of the virtual storage layer; and
   performing a data backup process to persistently store a copy of the data, which is associated with the application instance in the one or more non-persistent logical storage resources, to a backup storage system; and
   utilizing the stored configuration data of the virtual storage layer and the stored data associated with the application instance, to restore the data and the virtual storage layer for use by the application instance, upon restart of the data storage system.

2. The method of claim 1, wherein the one or more non-persistent logical storage resources comprise at least one of logical storage volumes and logical block devices.

3. The method of claim 1, further comprising, before performing the data backup process:
   inactivating the data storage system to prevent the data storage system from serving new input/output (I/O) requests; and
   disabling the data storage system from writing data to the storage devices;
   wherein the data backup process comprises an offline data backup process that is performed with the data storage system inactivated, to store an offline copy of the data, which is associated with the application instance in the one or more non-persistent logical storage resources, to the backup storage system.

4. The method of claim 3, further comprising shutting down each application instance which consumes data of the data storage system, prior to inactivating the data storage system.

5. The method of claim 1, wherein performing the data backup process comprises copying the data, which is associated with the application instance in the one or more non-persistent logical storage resources, to the backup storage system in data chunks, while ignoring data chunks that are not in use.

6. The method of claim 5, further comprising performing a checksum process which comprises generating a checksum value of each data chunk to be copied to the backup storage system, validating the checksum value, and saving the checksum value to a file in the backup storage system.

7. The method of claim 1, further comprising compressing the data prior to storing a copy of the data in the backup storage system, and storing a compressed copy of the data in the backup storage system.

8. The method of claim 1, further comprising:
   initiating a process to restart the data storage system subsequent to the shutdown of the data storage system;
   wherein utilizing the stored configuration data of the virtual storage layer and the stored data associated with the application instance, to restore the data and the virtual storage layer for use by the application instance, upon restart of the data storage system, comprises:
   restoring the data from the backup storage system to a newly allocated set of one or more storage devices of the data storage system; and
   activating the data storage system using the stored configuration data associated with the virtual storage layer.

9. The method of claim 1, wherein the data storage system comprises a scale-out software-defined storage system which is provided by a public cloud platform.

10. A computer program product comprising a non-transitory processor-readable storage medium having stored therein program code of one or more software programs, wherein the program code when executed by at least one processing device causes the at least one processing device:
   to initiate a process to shut down a data storage system which comprises storage devices that store data associated with an application instance in one or more non-persistent logical storage resources of a virtual storage layer which is configured by the data storage system to store the data associated with the application instance;
   in response to initiating the process to shut down the data storage system:
   to store configuration data associated with the virtual storage layer, the configuration data comprising information regarding a logical configuration of the virtual storage layer; and
   to perform a data backup process to persistently store a copy of the data, which is associated with the application instance in the one or more non-persistent logical storage resources, to a backup storage system; and
   to utilize the stored configuration data of the virtual storage layer and the stored data associated with the application instance, to restore the data and the virtual storage layer for use by the application instance, upon restart of the data storage system.

11. The computer program product of claim 10, wherein the one or more non-persistent logical storage resources comprise at least one of logical storage volumes and logical block devices.

12. The computer program product of claim 10, further comprising program code to inactivate the data storage system to prevent the data storage system from serving new input/output (I/O) requests, and to disable the data storage system from writing data to the storage devices, before performing the data backup process, wherein the data backup process comprises an offline data backup process that is performed with the data storage system inactivated, to store an offline copy of the data, which is associated with the application instance in the one or more non-persistent logical storage resources, to the backup storage system.

13. The computer program product of claim 12, further comprising program code to shut down each application instance which consumes data of the data storage system, prior to inactivating the data storage system.

14. The computer program product of claim 10, wherein the program code to perform the data backup process comprises program code to:
   copy the data, which is associated with the application instance in the one or more non-persistent logical storage resources, to the backup storage system in data chunks, while ignoring data chunks that are not in use; and perform a checksum process which comprises generating a checksum value of each data chunk to be copied to the backup storage system, validating the checksum value, and saving the checksum value to a file in the backup storage system.

15. The computer program product of claim 10, further comprising program code to compress the data prior to storing a copy of the data in the backup storage system, and store a compressed copy of the data in the backup storage system.

16. The computer program product of claim 10, further comprising program code:

to initiate a process to restart the data storage system subsequent to the shutdown of the data storage system;

wherein the program code to utilize the stored configuration data of the virtual storage layer and the stored data associated with the application instance, to restore the data and the virtual storage layer for use by the application instance, upon restart of the data storage system, comprises program code to:

restore the data from the backup storage system to the storage devices of the data storage system; and activate the data storage system using the stored configuration data associated with the virtual storage layer.

17. A cloud system, comprising:

a data storage system which comprises hardware storage devices that store data associated with an application instance in one or more non-persistent logical storage resources of a virtual storage layer which is configured by the data storage system to store the data associated with the application instance; and a control system configured to:

shut down the data storage system by executing a process which comprises: storing configuration data associated with the virtual storage layer, the configuration data comprising information regarding a logical configuration of the virtual storage layer; and performing a data backup process to persistently store a copy of the data, which is associated with the application instance in the one or more non-persistent logical storage resources, to a backup storage system; and utilize the stored configuration data of the virtual storage layer and the stored data associated with the application instance, to restore the data and the virtual storage layer for use by the application instance, upon restart of the data storage system.

18. The cloud system of claim 17, wherein the control system is configured to execute a process, before performing the data backup process, which comprises:

preventing the data storage system from serving new input/output (I/O) requests; and disabling the data storage system from writing data to the hardware storage devices;

wherein the data backup process comprises an offline data backup process that is performed with the data storage system inactivated, to store an offline copy of the data, which is associated with the application instance in the one or more non-persistent logical storage resources, to the backup storage system.

19. The cloud system of claim 17, wherein in performing the data backup process, the control system is configured to execute a process which comprises:

copying the data, which is associated with the application instance in the one or more non-persistent logical storage resources, to the backup storage system in data chunks, while ignoring data chunks that are not in use; and performing a checksum process which comprises generating a checksum value of each data chunk to be copied to the backup storage system, validating the checksum value, and saving the checksum value to a file in the backup storage system.

20. The cloud system of claim 17, wherein the control system is configured to restart the data storage system, subsequent to the shutdown of the data storage system, wherein in utilizing the stored configuration data of the virtual storage layer and the stored data associated with the application instance, to restore the data and the virtual storage layer for use by the application instance, upon restart of the data storage system, the control system is configured to restore the data from the backup storage system to the hardware storage devices of the data storage system, and activate the data storage system using the stored configuration data associated with the virtual storage layer.

\* \* \* \* \*